United States Patent
Aho et al.

(10) Patent No.: US 10,914,355 B2
(45) Date of Patent: Feb. 9, 2021

(54) BUSHINGS FOR DAMPING VIBRATIONS IN A VEHICLE

(71) Applicant: Volvo Car Corporation, Gothenburg (SE)

(72) Inventors: Christian Aho, Gothenburg (SE); Johan Samuelsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 7 days.

(21) Appl. No.: 16/416,456

(22) Filed: May 20, 2019

(65) Prior Publication Data

US 2020/0370614 A1 Nov. 26, 2020

(51) Int. Cl.
*F16F 1/38* (2006.01)

(52) U.S. Cl.
CPC .......... *F16F 1/3856* (2013.01); *F16F 1/3835* (2013.01); *F16F 1/3863* (2013.01); *F16F 2224/025* (2013.01); *F16F 2226/04* (2013.01)

(58) Field of Classification Search
CPC .......... F16F 1/38; F16F 1/3856; F16F 1/3835; F16F 1/3863; F16F 1/3842; F16F 1/3849; F16F 2224/025; F16F 2226/04; B60G 2204/41
See application file for complete search history.

(56) References Cited

U.S. PATENT DOCUMENTS

| | | | | |
|---|---|---|---|---|
| 2,122,839 A * | 7/1938 | Guy | ...................... | B60G 11/113 403/226 |
| 6,845,995 B2 * | 1/2005 | Cai | ...................... | B60G 21/0551 267/189 |
| 8,573,619 B2 * | 11/2013 | Koide | ...................... | B60G 11/16 280/124.141 |
| 8,585,065 B2 * | 11/2013 | Koide | ...................... | B60G 7/001 280/124.109 |
| 8,628,101 B2 * | 1/2014 | Koide | ...................... | B60G 7/001 280/124.108 |
| 8,678,409 B2 * | 3/2014 | Koide | ...................... | B60G 7/008 280/124.135 |
| 9,752,614 B2 * | 9/2017 | Siebeneick | ............. | F16C 17/02 |
| 10,603,970 B2 * | 3/2020 | Auten | ................... | F16F 1/3814 |
| 2005/0258583 A1 | 11/2005 | Schnaars et al. | | |
| 2008/0164645 A1 | 7/2008 | Bost et al. | | |
| 2010/0109213 A1 | 5/2010 | Schnaars et al. | | |
| 2012/0292872 A1 | 11/2012 | Koide et al. | | |
| 2014/0300040 A1 | 10/2014 | Tarnawsky | | |
| 2015/0219146 A1 * | 8/2015 | Siebeneick | ............. | F16C 17/02 280/124.153 |

* cited by examiner

*Primary Examiner* — Thomas W Irvin
(74) *Attorney, Agent, or Firm* — Clements Bernard Walker; Christopher L. Bernard

(57) ABSTRACT

Bushings and methods of manufacturing bushings to be used in a chassis of a vehicle or the like for damping and absorbing vibrations, oscillations, and noise are provided. In one implementation, a method of manufacturing a bushing includes the steps of positioning a flexible member around a cylindrical outer surface of a rigid inner member having a cylindrical inner surface or solid core and positioning an outer member having a cylindrical inner surface around the flexible member. The method also includes the step of clamping a cylindrical outer surface of the outer member to form an indentation in the cylindrical outer surface of the outer member, thereby deforming the flexible member. This method may be executed to create a bushing having certain axial, radial, and torsional stiffness.

20 Claims, 4 Drawing Sheets

BUSHINGS FOR DAMPING VIBRATIONS IN A VEHICLE

TECHNICAL FIELD

The present disclosure is generally directed to the automotive field. More particularly, the present disclosure relates to bushings and methods of manufacturing bushings that may be used in a vehicle for isolating, absorbing, or damping vibrations, oscillations, and/or noise.

BACKGROUND

Generally, vehicles include multiple bushings that are used for connecting various structural metal assemblies of the vehicle together. For example, the various structural metal assemblies of a vehicle may include a chassis, a frame, a suspension system, a motor/engine mount, a transmission mount, a passenger cabin shell, among others.

These bushings are designed primarily to serve two purposes. The first purpose is to provide a firm and secure connection between the metallic parts of the various structural metal assemblies. The second purpose is to provide a flexible material in between the metal portions to allow a degree of movement and absorb the vibration and noise that would otherwise be transferred directly from one metallic structural assembly to another.

Many bushings may be designed to provide balanced levels of strength and flexibility. For example, strength is needed for firmly connecting the structural assemblies together and flexibility is needed to help absorb or damp the vibrations, oscillations, or noise. Of course, if bushings are designed such that their strength is too high and their flexibility is too low, the passengers of the vehicle will experience too much vibration, and hence more discomfort. On the other hand, if the strength is too low and the flexibility is too high, a driver may have difficulty handling the vehicle or the vehicle may not respond properly. A considerable amount of time and effort may therefore be required to properly design bushings of a vehicle to achieve the proper balance between strength and flexibility.

Therefore, there is a need in the field of automotive design, particularly in the design of bushings, to simplify the design and manufacturing processes to enable a vehicle manufacturer to provide bushings that are capable of providing balanced levels of strength and flexibility with minimal manufacturing effort and expense.

SUMMARY

The present disclosure provides, among other things, various embodiments of bushings and methods of manufacturing bushings used in a vehicle for damping or isolating vibration and noise. In one embodiment of the present disclosure, a bushing includes a rigid inner member having a cylindrical inner surface or solid inner core and a cylindrical outer surface and an outer member initially having a cylindrical inner surface and a cylindrical outer surface. The bushing also comprises a flexible member positioned between the cylindrical outer surface of the rigid inner member and the cylindrical inner surface of the outer member. A center portion of the flexible member may initially have a cylindrical shape. However, during a clamping or denting process, an indentation is formed in a center portion of the cylindrical outer surface of the outer member, whereby the indentation also deforms the cylindrical inner surface of the outer member and the cylindrical shape of the center portion of the flexible material, compressing center portion of the flexible material between the indentation and the outer surface of the rigid inner member.

According to another embodiment, a method of manufacturing a bushing of a vehicle is provided. The method comprises the steps of positioning a flexible member around a cylindrical outer surface of a rigid inner member having a cylindrical inner surface or solid core and positioning an outer member having a cylindrical inner surface around the flexible member. The method further comprises the step of clamping or indenting a cylindrical outer surface of the outer member to form an indentation in the cylindrical outer surface of the outer member, thereby also deforming the flexible member and compressing flexible member between the indentation and the outer surface of the rigid inner member.

According to yet another embodiment, a chassis of a vehicle is provided. The chassis in this embodiment comprises a frame and one or more metal assemblies selected from a suspension system, a motor/engine mount, and/or a transmission mount. The chassis also comprises a plurality of bushings connected between the frame and the one or more metal assemblies for damping vibration. Each of the bushings comprises a rigid inner member having a cylindrical inner surface or solid core and a cylindrical outer surface, an outer member initially having a cylindrical inner surface and a cylindrical outer surface, and a flexible member positioned between the cylindrical outer surface of the rigid inner member and the cylindrical inner surface of the outer member. A center portion of the flexible member initially includes a cylindrical shape. During a clamping or indenting process, however, an indentation is formed in a center portion of the cylindrical outer surface of the outer member. Consequently, the indentation is adapted to deform the cylindrical shape of the center portion of the flexible material.

BRIEF DESCRIPTION OF THE DRAWINGS

The present disclosure is directed to various embodiments illustrated and described herein with reference to the various drawings, in which like reference numbers are used to denote like system or assembly components/methods or algorithm steps. The illustrated components of the various systems are not necessarily drawn to scale.

DESCRIPTION OF EMBODIMENTS

The present disclosure describes various embodiments of bushings that are used in a vehicle for damping vibrations that would otherwise be transferred from one metal part to another. For example, a chassis of a vehicle may include several structural metallic assemblies, such as the frame, suspension system, engine/motor mounts, transmission mounts, etc., which are connected together in a secure manner. However, because of the tendency of connected metal components to efficiently transfer vibrational energy from one part to another, a vehicle is typically equipped with a plurality of bushings that isolate or damp these vibrational forces, thereby significantly reducing the amount of vibration, oscillations, and noise that is transferred to other parts of the vehicle. As a result, the passengers in the vehicle may experience a much more comfortable ride, which may essentially be free of excessive amounts of vibration and noise.

When bushings for a vehicle are designed, a designer may attempt to balance the strength of a bushing for adequately holding the structural assemblies together while also providing a degree of relative movement and proper vibration/noise absorption. As described in the present disclosure, this balance between structural strength and vibration damping can be achieved by creating bushings with the proper dimensions and features to provide a sufficient stiffness without sacrificing passenger comfort. Achieving this balance can be the result of research and development, alterations to machining or casting tools, and/or performing calibration processes to the bushings after the parts of the bushing have been assembled. The following implementations provide bushings and methods of manufacturing bushings to achieve this proper balance.

Figure 1:
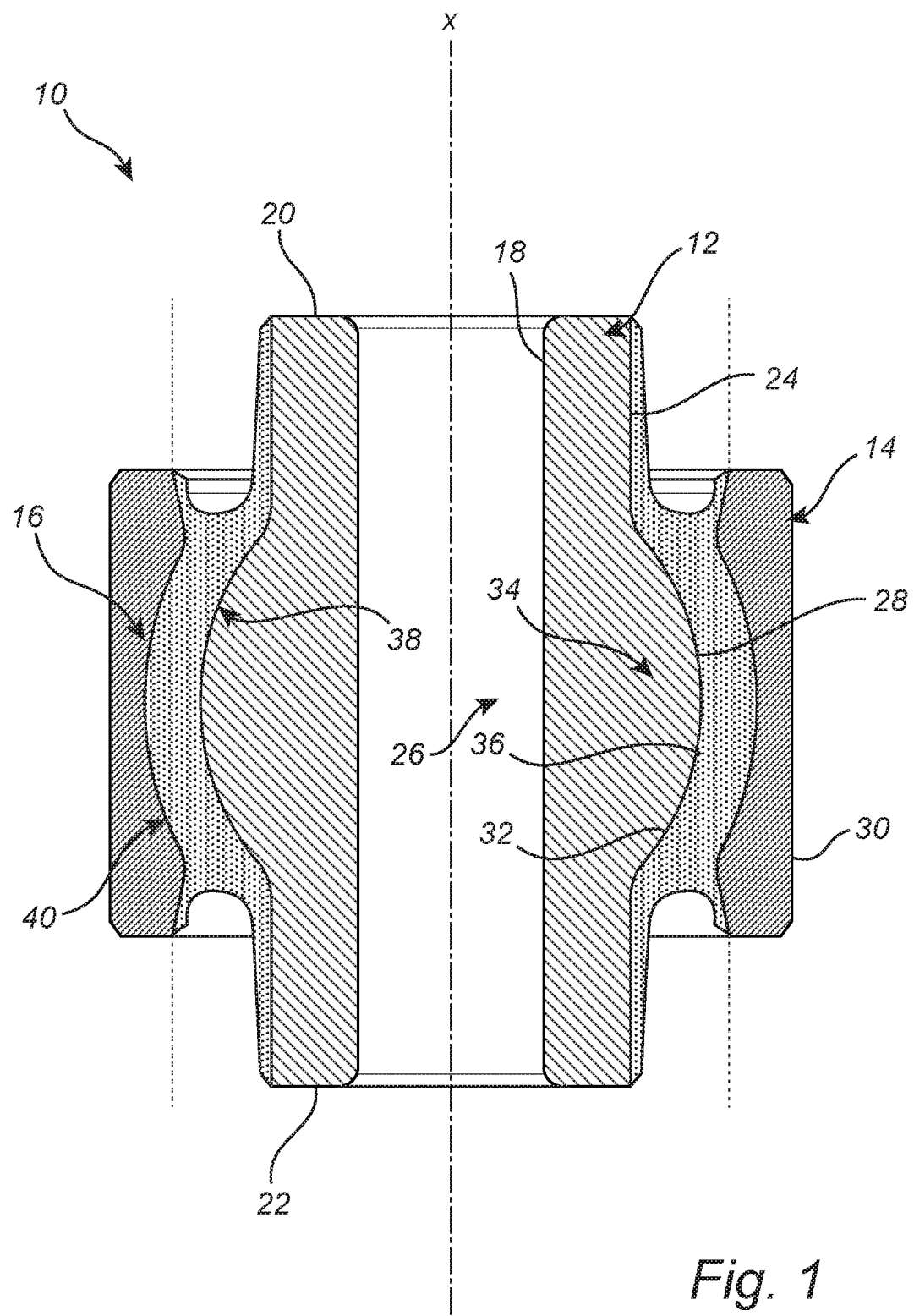
FIG. 1 is a diagram illustrating a cross-sectional side view of a first bushing for damping vibrations and/or noise in a vehicle, according to various embodiments of the present disclosure.

FIG. 1 shows a cross-sectional side view of a first (conventional) embodiment of a bushing 10. In this embodiment, the bushing 10 includes an inner metal part 12, an outer metal part 14, and a flexible member 16 positioned between the inner metal part 12 and the outer metal part 14. In use, the inner metal part 12 may be adapted for connection (e.g., by securing with nuts and bolts) to a first structural assembly (not shown) of a vehicle. For example, the first structural assembly may include the chassis of the vehicle. Also, the outer metal part 14 may be adapted for connection (e.g., by welding) to a second structural system (not shown) of the vehicle. For example, the second structural system may include a suspension system of the vehicle, an engine/motor mount for supporting an engine of the vehicle, a transmission mount for supporting a transmission system of the vehicle, a body mount for supporting a passenger cabin frame of the vehicle, or other systems, structures, mounts, etc., of the vehicle. The suspension system, for instance, may include control arms (e.g., A-arms, wishbone links, double wishbone links, etc.), springs (e.g., leaf springs, torsion bars, coil springs, etc.), struts, shock absorbers, shock absorber mountings, sway bars, etc.

The bushing 10 may include features that are substantially symmetrical around a center axis (e.g., x-axis). When the bushing 10 is connected to the first and second structural systems, the bushing 10 is adapted to provide a certain amount of axial stiffness along a direction defined by the center axis or x-axis. Also, the bushing 10 may provide a certain amount of radial stiffness along directions perpendicular to the x-axis. Furthermore, the bushing 10 may also provide a certain amount of torsional stiffness in a direction that circles around the x-axis. According to various embodiments, the specific features and dimensions of the inner metal part 12, outer metal part 14, and flexible member 16 of the bushing 10 can provide certain levels of axial, radial, and torsional stiffness to achieve a balance between strength and flexibility.

For example, the inner metal part 12 may include a tubular or cylindrical inner surface 18, which may be symmetrical about the x-axis. The cylindrical inner surface 18 may have a certain diameter to accommodate a bolt from bolting the inner metal part 12 to one of the structural metal assemblies mentioned above.

The cylindrical inner surface 18 may include a cylindrical shape along the entire length of the inner metal part 12 along the x-axis. Alternatively, the cylindrical inner surface 18 may include a cylindrical shape at least along a middle portion of the inner metal part 12, excluding small areas near a top edge 20 and/or bottom edge 22 of the inner metal part 12 to fit with associated nuts and bolts that may be used for connection to the chassis, frame, or other metal assemblies of the vehicle. An outer surface 24 of the inner metal part 12 may be substantially cylindrical near the top edge 20 and bottom edge 22. In this embodiment, a middle section 26 of the inner metal part 12 may include an outwardly projecting bulge 28, which may include points that may be defined by parts of a sphere formed symmetrically around the x-axis.

As shown in FIG. 1, the outer metal part 14 of the bushing 10 may include an outer surface 30 having a substantially cylindrical shape, hexagonal shape, or other suitable shape. The outer surface 30, according to some embodiments, may be cylindrical and may be substantially centered around the x-axis. An inner surface 32 of the outer metal part 14 may include an undulating shape, which differs from conventional bushings whereby an inner surface of an outer piece may typically and more-conventionally be straight (i.e., cylindrical when viewed in three dimensions). A middle section 34 of the outer metal part 14 may include an inwardly developed recess 36, which may include points that may be defined by parts of a second sphere formed symmetrically around the x-axis, the points being formed around and substantially equidistant from corresponding points on the spherical portion (e.g., outwardly projecting bulge 28) of the inner metal part 12.

Formed in between the inner metal part 12 and outer metal part 14 is the flexible member 16. During manufacture, the flexible member 16 may be heated to allow the flexible member 16 to take a fluid form, allowing the flexible member 16 to be molded around the outwardly projecting bulge 28 of the inner metal part 12. While the flexible member 16 is still pliable, the outer metal part 14 may be positioned around the inner metal part 12. When the flexible member 16 is cooled and solidified, the flexible member 16 may assume the shape of the surrounding members, and thus may include an inner surface 38 having the form of the outwardly projecting bulge 28 of the inner metal part 12 and an outer surface 40 having the form of the inwardly developed recess 36 of the outer metal part 14.

After the bushing 10 is manufactured, the axial stiffness, radial stiffness, and torsional stiffness may essentially be set. That is, the specific design of the bushing 10 and the properties of the flexible material 16, when manufactured, determine the characteristics of the bushing 10 for damping the vibrations and noise that might otherwise be transferred from one structural system to another.

One drawback with this embodiment, however, is that the research and development for achieving the desired strength and flexibility characteristics of the bushing 10 may be time-consuming and expensive. One step in the manufacturing process, for instance, is the design and creation of casting tools for casting the parts 12, 14. If alterations are to be made to the bushing 10, the tooling equipment may need to be altered or switched out to create new form designs for the inner metal part 12 and outer metal part 14. Thus, during development, it may be necessary to change the casting tools to achieve different sizes and shapes of the parts 12, 14, such as to tweak the size and shape of the bump 28 of the inner metal part 12.

Although the bushing 10, when manufactured, may include ideal properties for strength and flexibility for some applications, alterations may be needed for providing various types of bushings for various types of vehicles. Creating different shapes of the inner metal part 12 and outer metal part 14 may therefore require extensive testing to achieve the proper axial stiffness and radial stiffness for different application, which may not be cost effective. Therefore, other manufacturing strategies may be preferred to achieve the same or similar stiffness characteristics of a bushing.

Figure 2:
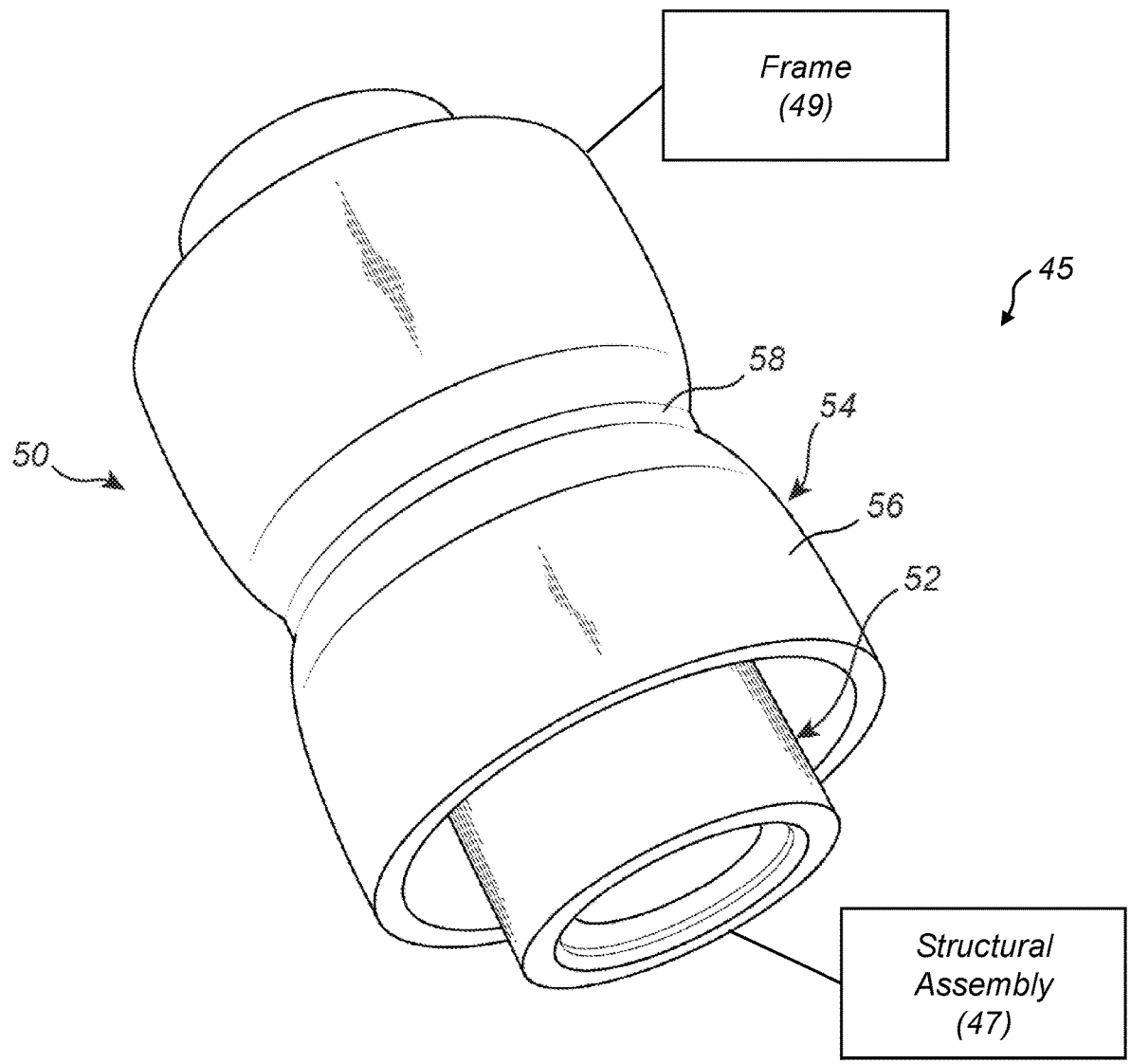
FIG. 2 is a diagram illustrating a perspective view of a second bushing for damping vibrations and/or noise in a vehicle, according to various embodiments of the present disclosure.

FIG. 2 shows a perspective view of another embodiment of a bushing 50. The bushing 50 in this embodiment is also adapted for isolating or damping vibrations, oscillations, and noise in a vehicle. The bushing 50 may be manufactured in a simplified manner to allow various stiffness parameters without the necessity of retooling the manufacturing equipment if changes to the design of the inner and outer parts are needed.

In this embodiment, the bushing 50 includes an inner member 52 and an outer member 54. For example, the inner member 52 and/or outer member 54 may comprise metal, carbon steel, aluminum alloy, or other substantially rigid material. Also, a flexible member (not shown in FIG. 2) may be positioned between the inner member 52 and outer member 54. The inner member 52 is coupled to a metal structural assembly 47 of the vehicle and the outer member 54 is coupled to the frame 49 of the chassis 45 of the vehicle, or vice versa.

Initially, the outer member 54 may include an outer surface 56 that is substantially cylindrical. However, one of the steps of a manufacturing process, according to the teachings of the present disclosure, may include the step of clamping a portion of the outer surface 56 to create an indentation 58 therein. After the entire manufacturing process, including the clamping step, the resulting product may include the bushing 50 having the indentation 58. The clamping process, according to some embodiments, may utilize a calibration tool, designed to reduce the diameter of a cylindrical object. The calibration tool may be adjusted as needed to apply a proper amount of clamping force to create the bushing 50. Therefore, the bushing 50 may be constructed to include a desired amount of strength and flexibility and to further include a desired axial stiffness, radial stiffness, and/or torsional stiffness.

During a research and development stage, the tooling machinery for creating the inner member 52 and outer member 54 may be the same for a number of different bushings. However, one of the benefits of the manufacturing processes for creating the bushing 50 of FIG. 2 is that the clamping process (e.g., using the calibration tool) may be adjusted as needed to create the desired characteristics of the bushing 50 based on the amount of force that is applied and/or the extent (i.e., radially inward distance) of the indentation 58. If changes are needed to alter the stiffness characteristics of the bushing 50, the tooling machinery may not need to be changed, which can be an expensive procedure. Instead, the clamping process can be adjusted as needed to achieve different results. Therefore, the same machine tools may be used to form the inner member 52 and outer member 54 and different additional manufacturing steps can be executed to create different bushings having different strength and flexibility parameters.

According to other implementations, the outer member 54 may be cast having the indentation 58 already formed therein. In this respect, the manufacturing process may be altered accordingly, such as by altering a curing process of a flexible material formed between the inner member 52 and outer member 54, to achieve the desired stiffness properties.

Figure 3:
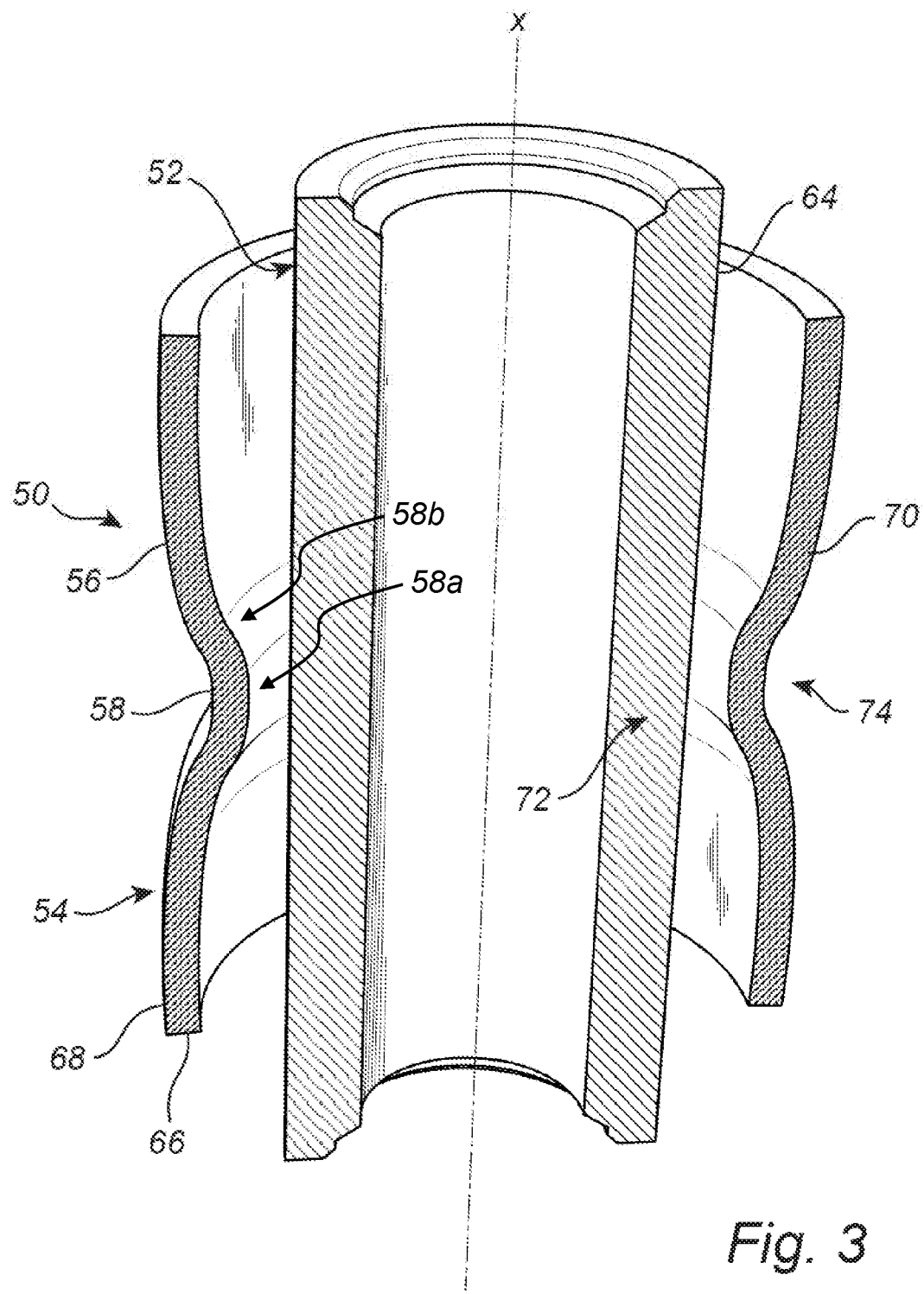
FIG. 3 is a diagram illustrating a cross-section side view of the second bushing of FIG. 2, according to various embodiments.

FIG. 3 shows a cross-sectional side view of the bushing 50 of FIG. 2, according to various embodiments. As illustrated, the bushing 50 includes the rigid inner member 52 having a cylindrical inner surface 62 and a cylindrical outer surface 64. The inner surface 62 and outer surface 64 of the rigid inner member 52 may retain their shape throughout the manufacturing process. In some embodiments, the inner surface 62 may have a diameter about an x-axis that enables a nut and bolt to connect the rigid inner member 52 of the bushing 50 to a structural metal assembly (e.g., the chassis) of the vehicle.

The bushing 50 also includes the outer member 54 initially having a cylindrical inner surface 66 and a cylindrical outer surface 68. FIG. 3 also shows a flexible member 70 positioned between the cylindrical outer surface 64 of the rigid inner member 52 and the cylindrical inner surface 66 of the outer member 54. The flexible member 70 (and more particularly a center portion 72 of the flexible member 70) may initially include a substantially cylindrical shape. However, during a clamping process, the indentation 58 is formed in a center portion 74 of the outer member 54. When the indentation 58 is formed, the clamping process exerts a force on the outer member 54 to create the indentation 58, which in turn deforms the cylindrical shape of the center portion 72 of the flexible material 70. As illustrated, the indentation 58 may preferably include a substantially flat bottom portion 58a and a plurality of transition portions 58b that transition the bottom portion 58a into the remainder of the outer member 54. This substantially flat bottom portion 58a is aligned substantially parallel to the outer surface of the inner member 52. Thus, the substantially flat bottom portion 58a provides the indentation 58 with a significant width, as opposed to the indentation 58 forming a continuously curving or sharp point structure. This width then compresses the flexible material 70 in an even manner across a wider area of the flexible material 70. More localized point compression of the flexible material 70 is not desirable.

During the manufacturing process, two steps may be performed one after the other in either sequence or may be performed simultaneously. These two steps include a first step of creating the indentation 58 (e.g., by clamping) and a second step, which may include a process of curing or vulcanizing the material that forms the flexible member 70. The manufacturing process can be adjusted by altering these steps according to various implementations to create different stiffness characteristics of the bushing 50. Since the flexible material may include an elastomeric material, such as rubber, silicone, polyurethane, etc., the curing process may include at least a vulcanization process of treating the elastomeric material with sulfur to harden the material.

According to a first implementation of a material-curing step of the manufacturing process, the flexible member 70 may be cured (e.g., vulcanized) and cooled in a mold before it is placed around the outer surface 64 of the inner member 52. Then, the outer member 54 may be placed around the outer surface of the flexible member 70 before the clamping process is performed. In this respect, the flexible member 70, having already been cured, may provide a greater resistance or greater firmness with the inner member 52 and outer member 54 when compressed in the clamping step. This extra force may be taken into account when adjusting the manufacturing process to achieve a desired axial, radial, and torsional stiffness.

According to a second implementation of material-curing step of the manufacturing process, the flexible member 70 may be cured (e.g., vulcanized) and cooled during the clamping process. As such, the flexible member 70 may be is a somewhat fluid state when formed around the inner member 52 and during the placement of the outer member 54 around the flexible member 70. The flexible member 70 (and, in some cases, the outer member 54) may be heated such that the materials may be more pliable. While heated, the clamping process may proceed in order to form the indentation 58 in the outer member 54 and the deformation in the center portion 72 of the flexible member 70. When the curing process is complete and the flexible member 70 is cooled, the flexible member 70 may have the form created by the outer dimensions of the inner member 52 and the inner dimensions of the outer member 54 (including the indentation features). The indentation 58 may be created when the outer member 54 is heated and more pliable, during or after which a curing process of the flexible member 70 may be performed.

According to a third implementation of a material-curing step of the manufacturing process, the flexible member 70 may be cured (e.g., vulcanized) after the clamping process. In some embodiments, the initially fluid material of the flexible member 70 may be applied after the outer member 54 has been clamped. In other embodiments, the flexible member 70 may be in an intermediate stage of curing, such that the completion of the curing or vulcanization process occurs after the clamping process.

As a result, the bushing 50 may be manufactured to include similar properties to the embodiment of the bushing 10 of FIG. 1. As such, the bushing 50 may have a high axial stiffness, high radial stiffness, and high torsional stiffness. Although the bushing 50 may have similar stiffness parameters, the manufacturing process for creating the bushing 50 may be simplified and may allow for greater versatility with respect to adjustments in the manufacturing process to strategically alter the stiffness parameters as needed for producing different bushings with different stiffness characteristics.

Also, the embodiment of FIGS. 2-3 may be an improvement over the embodiment of FIG. 1 in that the manufacturing process for creating the bushing 50 may be more cost effective. Furthermore, it may be possible to achieve the desired bushing characteristics in a faster and easier way, without requiring the re-tooling of casting equipment. Instead, the manufacturing process for creating the bushing 50 may allow changes to the stiffness parameters by simply altering the clamping step performed by a calibration tool.

Figure 4:
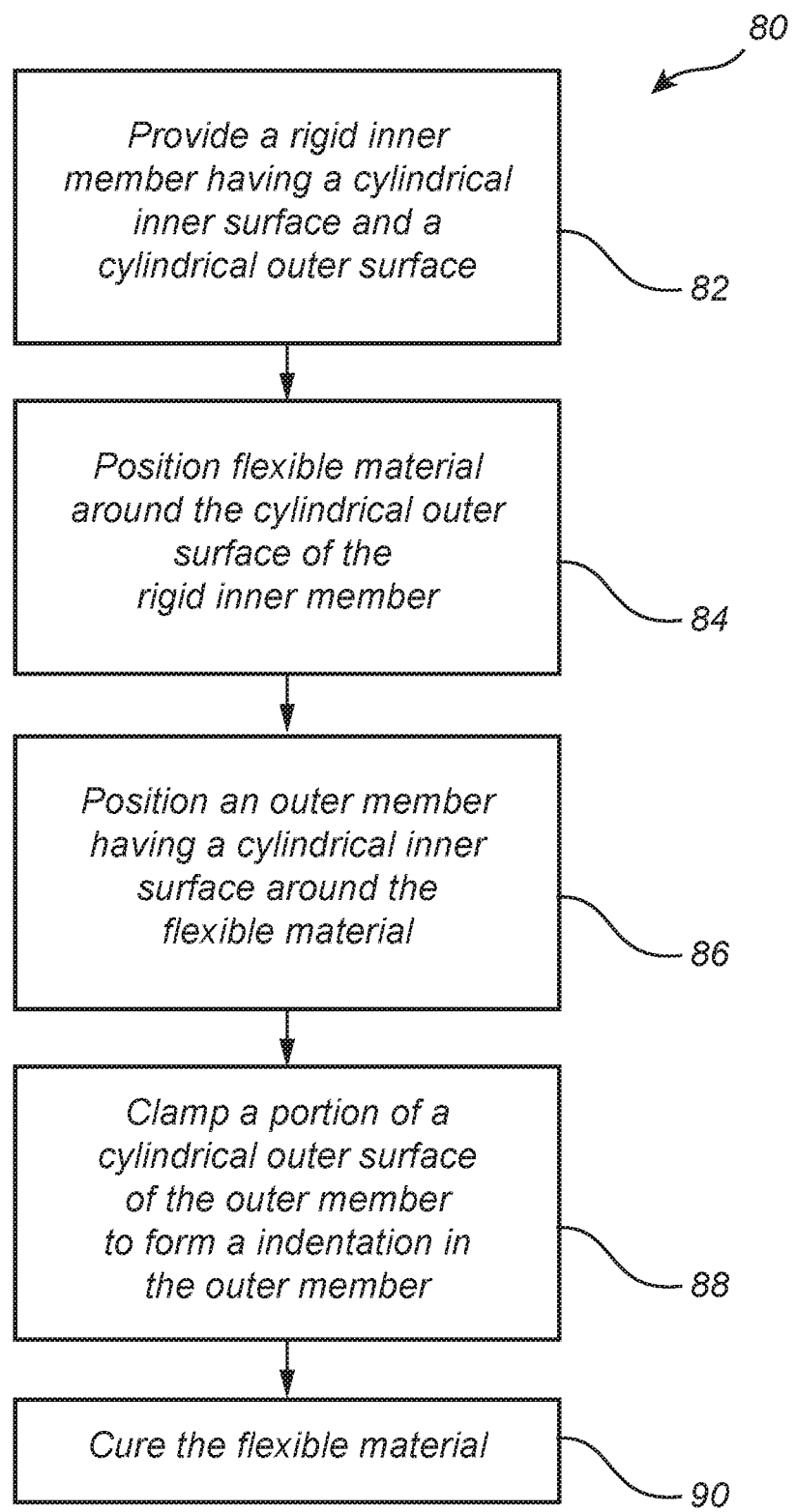
FIG. 4 is a flow diagram illustrating a method for manufacturing a bushing of a vehicle, according to various embodiments.

FIG. 4 is a flow diagram showing a method 80 for manufacturing a bushing that can be used in a vehicle for damping or isolating vibration and noise between structural systems of the vehicle. As shown, the method 80 includes a step of providing a rigid inner member having a cylindrical inner surface and a cylindrical outer surface, as indicated in block 82. For example, the rigid inner member may have substantially the same physical characteristics as a short length of pipe or tube.

The method 80 further includes positioning a flexible material around the cylindrical outer surface of the rigid inner member, as indicated in block 84. In some embodiments, the flexible material may be a pre-formed flexible member (e.g., a member having already been cured and/or vulcanized). According to other embodiments, the flexible material may be a material that is in an intermediate state before final curing and/or is in a fluid state (e.g., as a result of heating the flexible material).

The method 80 further includes positioning an outer member having a cylindrical inner surface around the flexible material, as indicated in block 86. The step of block 86 may include various processes depending on the state of the flexible material described with respect to block 84. In alternative embodiments, the method 80 may include a sequence in which blocks 84 and 86 are switched, whereby the outer member is placed around the rigid inner member before the flexible material is applied between the rigid inner member and outer member.

Once the members are properly positioned with respect to each other, the method 80 includes the step (i.e., block 88) of clamping a portion of a cylindrical outer surface of the outer member to form an indentation in the outer member. The process of clamping, as indicated in block 88, may essentially deform the shape of the flexible material such that it also includes an indentation. In some embodiments, the clamping step of block 88 may be performed before the outer member is positioned around the flexible material (i.e., block 86) and/or before the flexible material is positioned around the rigid inner member (i.e., block 84).

The step of clamping the cylindrical outer surface of the outer member may be enacted by clamping along the entire length of the outer surface in a uniform manner. In other embodiments, the clamping may be performed on only a portion of the outer surface, such as a center part (when considered along the axial length) of the outer member. For example, the portion that is clamped may include less than half of the entire cylindrical outer surface. In still other embodiments, the clamping may include a non-uniform clamping process where different portions of the outer surface of the outer member may be subject to different forces or indented to different extents. A center portion of the outer member, for instance, may be subject to a greater force and/or indented farther than portions closer to the axial ends of the outer member.

Also, the method 80 includes the step (i.e., block 90) of curing the flexible material such that the flexible material will be properly hardened and ready for use. As suggested above, the curing step of block 90 may be performed at any stage in the method 80. For example, the step may be performed after the clamping step of block 88. In other embodiments, the vulcanization step (block 90) may be performed concurrently with the clamping step (block 88). In still other embodiments, block 90 may be executed before, during, or after any of steps 82, 84, 86.

As used herein, including in the claims, the term "cylindrical" used for convenience only and is intended to encompass and be interchangeable with any like term denoting a tubular, rod-like, concentric, hollow, solid, or like shape. For example, "cylindrical" can denote a hollow or solid elongate structure that has other than a circular cross-section, without limitation.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. A bushing for damping vibrations, the bushing comprising:
    a rigid inner member having a cylindrical inner surface or solid core and a cylindrical outer surface;
    an outer member having a cylindrical inner surface and a cylindrical outer surface; and
    a flexible member disposed between the cylindrical outer surface of the rigid inner member and the cylindrical inner surface of the outer member, a center portion of the flexible member having a cylindrical shape;
    wherein an indentation is formed via an indentation process in a center portion of the cylindrical outer surface and the cylindrical inner surface of the outer member, the indentation correspondingly deforming and compressing the cylindrical shape of the center portion of the flexible member, wherein the indentation comprises a flat bottom portion parallel to the cylindrical outer surface of the rigid inner member disposed between a plurality of transition portions that transition the flat bottom portion into a remainder of the outer member, and wherein the indentation, the flat bottom portion, and the plurality of transition portions circumferentially traverse the entire outer member.

2. The bushing of claim 1, wherein the indentation process does not change the cylindrical outer surface of the rigid inner member.

3. The bushing of claim 1, wherein the flexible member includes an elastomeric material.

4. The bushing of claim 3, wherein the indentation process is performed before or during a vulcanization process of the elastomeric material.

5. The bushing of claim 1, wherein the indentation process is performed by a calibration tool.

6. The bushing of claim 1, wherein the indentation process includes applying a clamping force to the outer member to obtain a desired axial stiffness, radial stiffness, and torsional stiffness of the bushing.

7. A method of manufacturing a bushing, the method comprising the steps of:
    disposing a flexible member around a cylindrical outer surface of a rigid inner member having a cylindrical inner surface or solid core;
    disposing an outer member having a cylindrical inner surface around the flexible member; and
    clamping a cylindrical outer surface of the outer member to form an indentation in the cylindrical outer surface and cylindrical inner surface of the outer member, thereby deforming and compressing a portion of the flexible member, wherein the indentation comprises a flat bottom portion parallel to the cylindrical outer surface of the rigid inner member disposed between a plurality of transition portions that transition the flat bottom portion into a remainder of the outer member, and wherein the indentation, the flat bottom portion, and the plurality of transition portions circumferentially traverse the entire outer member.

8. The method of claim 7, wherein the step of clamping the cylindrical outer surface of the outer member does not change the cylindrical outer surface of the rigid inner member.

9. The method of claim 7, wherein the step of disposing the flexible member around the cylindrical outer surface of the rigid inner member includes a step of molding the flexible member around the cylindrical outer surface of the rigid inner member.

10. The method of claim 9, wherein the flexible member includes an elastomeric material.

11. The method of claim 10, further comprising a step of vulcanizing the elastomeric material during or after the step of clamping the cylindrical outer surface of the outer member.

12. The method of claim 7, wherein the step of clamping the cylindrical outer surface of the outer member includes the step of utilizing a calibration tool to form the indentation.

13. The method of claim 12, wherein the step of clamping the cylindrical outer surface of the outer member includes the step of utilizing the calibration tool to apply a clamping force to obtain a desired axial stiffness, radial stiffness, and torsional stiffness of the bushing.

14. The method of claim 7, wherein the step of clamping the cylindrical outer surface of the outer member includes the step of clamping a portion of the cylindrical outer surface of the outer member, the portion being less than half of the entire cylindrical outer surface.

15. A vehicle chassis, the vehicle chassis comprising:
    a frame;
    one or more metal assemblies selected from a suspension system, an engine mount, and/or a transmission mount; and
    one or more bushings connected between the frame and the one or more metal assemblies for damping vibrations, each of the one or more bushings comprising:
        a rigid inner member having a cylindrical inner surface or solid core and a cylindrical outer surface;
        an outer member having a cylindrical inner surface and a cylindrical outer surface; and
        a flexible member disposed between the cylindrical outer surface of the rigid inner member and the cylindrical inner surface of the outer member, a center portion of the flexible member having a cylindrical shape;
        wherein an indentation is formed via an indentation process in a center portion of the cylindrical outer surface and the cylindrical inner surface of the outer member, the indentation correspondingly deforming and compressing the cylindrical shape of the center portion of the flexible member, wherein the indentation comprises a flat bottom portion parallel to the cylindrical outer surface of the rigid inner member disposed between a plurality of transition portions that transition the flat bottom portion into a remainder of the outer member, and wherein the indentation, the flat bottom portion, and the plurality of transition portions circumferentially traverse the entire outer member.

16. The vehicle chassis of claim 15, wherein the indentation process does not change the cylindrical outer surface of the rigid inner member.

17. The vehicle chassis of claim 15, wherein the flexible member includes an elastomeric material.

18. The vehicle chassis of claim 17, wherein the indentation process is performed before or during a vulcanization process of the elastomeric material.

19. The vehicle chassis of claim 15, wherein the indentation process is performed by a calibration tool.

20. The vehicle chassis of claim 15, wherein the indentation process includes applying a clamping force to the outer member to obtain a desired axial stiffness, radial stiffness, and torsional stiffness of the bushing.

* * * * *